United States Patent [19]

Richter

[11] 3,829,705

[45] Aug. 13, 1974

[54] CIRCUIT ARRANGEMENT FOR ESTABLISHING A CONSTANT POTENTIAL OF THE CHASSIS OF AN ELECTRICAL DEVICE WITH RELATION TO GROUND

[75] Inventor: Heinz Richter, Kronach, Germany

[73] Assignee: Loewe Opta GmbH, Kronach, Germany

[22] Filed: May 24, 1973

[21] Appl. No.: 363,493

[30] Foreign Application Priority Data

May 25, 1972 Germany........................... 2225379

[52] U.S. Cl. .................................. 307/94, 307/116

[51] Int. Cl. ........................................ H01h 35/00

[58] Field of Search...................... 307/116, 118, 94; 317/DIG. 2; 340/365 C; 200/DIG. 2

[56] References Cited

UNITED STATES PATENTS 3,530,310 9/1970 Adelson et al. ................ 340/365 C

OTHER PUBLICATIONS

Garner, "Intrusion Detector," Electronic Circuits Manual, 1971, p. 92.

*Primary Examiner*—B. Dobeck
*Assistant Examiner*—William J. Smith
*Attorney, Agent, or Firm*—Arthur O. Klein

[57] ABSTRACT

Circuit arrangement for establishing a reference potential of a chassis of an electrical device such as a radio and/or TV receiver, such device being provided with at least one contactless touching switch operating under the AC voltage principle. The device is switched by touching a unipole touching field in a contactless manner so as to establish connection to a grounded network pole. The circuit arrangement includes in combination an electronic blocking switch and a unidirectional rectifier which separates such switch from the network during the blocking phase.

2 Claims, 1 Drawing Figure

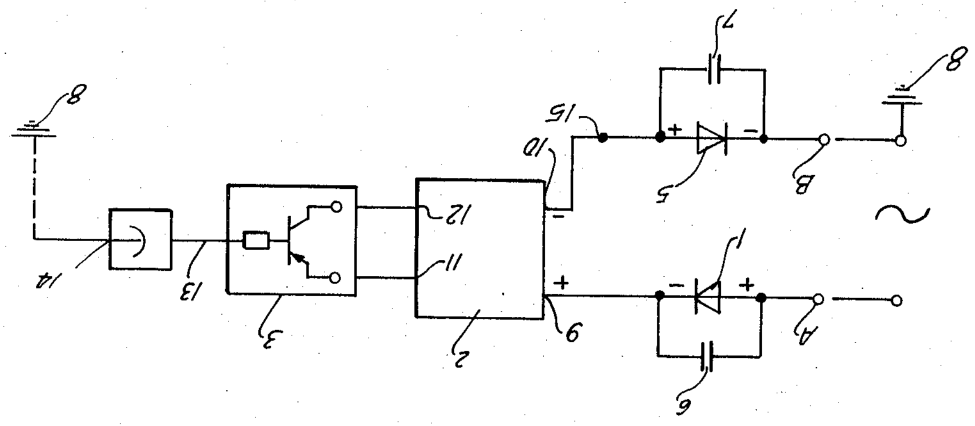

CIRCUIT ARRANGEMENT FOR ESTABLISHING A CONSTANT POTENTIAL OF THE CHASSIS OF AN ELECTRICAL DEVICE WITH RELATION TO GROUND

This invention relates to a circuit arrangement for establishing a constant reference potential on the chassis of an electrical instrument such as a radio and/or a TV receiver. Such instrument includes at least one contactless touching switch operating under the AC voltage principle, whereby by touching a single pole touching field the contactless switch is operated.

In electronic devices, for example TV and radio receivers, there are used in ever increasing numbers electronic touching switches for switching and adjusting the functions of the device. In one known embodiment of this type of touching switch, which operates on a DC voltage principle, the function of the electronic device, is contactlessly switched by touching a unipole touching field, the switching being carried out by means of an alternating current voltage. When using such a unipole touching electrode, one takes advantage of the fact that the AC current circuit is generally unipolarly grounded. In order to close the circuit by touching the touching surface via the body of the operator to ground, it is necessary to provide an AC voltage on the touching field. In one special known embodiment there is employed a known bridge current rectifier for the current supply. This type of arrangement has the drawback that the chassis of the device changes its polarity relative to the grounded network pole with the network frequency. With such construction considerable difficulties appear when connecting measuring instruments to the device, such difficulties possibly eventually leading to the destruction of individual parts of the electronic device.

In order to avoid these drawbacks, the present invention provides a normal combination of a unidirectional rectifier with an electronic blocking switch that separates the chassis of the electronic device from the network during the blocking phase. In accordance with the present invention, the polarity of the chassis of the electronic device does not periodically change, because the electronic device is practically separated from the network during the blocking phase of the unidirectional rectifier by means of the electronic blocking switch.

In a further embodiment of the invention a further rectifier is connected in series with the unidirectional rectifier in the connection between the circuit and the negative pole of the chassis. Such further rectifier is preferably a diode which is switched in the transfer direction of the unidirectional rectifier. According to another feature of the invention there are provided condensers, a respective condenser being connected parallel with each of the rectifiers. Preferably the two condensers have equal capacitances. Because of the use of such condensers, which are required because of high frequency reasons, during the blocking phase there is conducted to the chassis of the electronic device an AC voltage proportional to the order of capacitances of the condensers. Thus there is placed upon the touching field in a desired manner an AC voltage, and there is thereby assured a secure functioning of the adjustment of the device when such touching occurs.

In the embodiment of the invention employing two rectifiers there is the further advantage that over a bridging over of the minus conduit of the rectifier that is connected between the network and the negative pole of the chassis connection, no injuries can be caused by a measuring instrument in the electronic device itself and in the circuit arrangement connected thereto.

In the accompanying drawing:

The sole FIGURE of the drawing is a circuit diagram of a preferred embodiment of the invention.

In the illustrated embodiment the current supply part of the device, shown at the left, is connected via connecting terminals A and B to an AC voltage source, the terminal B being grounded at 8. The current supply part consists of a unidirectional rectifier in the form of a diode 1 with its anode connected to the terminal I, the cathode of diode 1 being connected to one input terminal 9 of an electronic device 2. In the device 2 there is also arranged a sensor circuit 3, shown here mainly as a block, circuit 3 being shown as including a pnp input transistor the emitter of which is connected to an output terminal 11 of the device 2. The collector of such transistor is connected to the other output terminal 12 of the device 2. The base of the transistor is connected by a wire 13 to a unipolar touching field 4 which may be in the form of a simple metal plate instead of the pnp transistor shown, the sensor circuit itself may consist of a standard integrating circuit which controls, among other things, the periodic sequential switching during the touching time of the touching field 4. All of the circuits of the electronic device 2 are isolated in a known manner from the chassis potential. Between the network terminal B and the negative pole' 10 of the chassis there is arranged in the direction opposite that of diode 1 a further diode 5, the anode of diode 5 being connected to the terminal 10, and the cathode of diode 5 being connected to the terminal B of the current supply. To provide for HF type bridging of the diodes 1 and 5 there are arranged condensers 6 and 7 respectively, which are connected in parallel with such diodes.

The invention functions by reason of the fact that in an AC network separate devices radiate electromagnetic waves which produce freely traveling fields in the body of the person who is operating and/or adjusting the device, thereby producing an alternating current through his body to ground, as indicated by the - line at the right of the circuit diagram. If now the person operating the device touches the switching field 4, then the pnp type input transistor of the sensor circuit 3, which is placed on a definite reference potential (for example 12 Volts) and is connected with the negative halfwave of the AC voltage potential, is made conductive. There is thereby released a control command in the sequential switching, for example, for switching the electronic device to the next receiving channel. It is understood that the most suitable connection is formed between ground and the touching field 4 by means of a wire. By the use of such wires it would be assured that in all cases the base of the transistor in circuit 3 is connected to ground. This would, however, not permit anyone to operate the switch without the use of an auxiliary means such as a wire. It will be assumed that the touching almost always results directly via the almost isolated human body. For this reason the AC current fields are necessary, because otherwise there cannot always be provided a ground contact. Thus this connection is established via the body resistance of the person carrying out the touching of the switch.

The positive half wave of the alternating current travels to the terminal 9 of the electronic device 2 after such current has been rectified and smoothed by the devices 1, 6. Such positive halfwave is also conducted to the sensor circuit 3. The thus formed current circuit is closed by way of the chassis of the electronic device 3, the diode 5, and the terminal B. When there is a negative halfwave of the alternating current delivered by the current supply, both diodes 1 and 5 remain closed so that the chassis of the device 2 remains separated from the network during the blocking phase. Nevertheless, by means of condensers 6 and 7 the chassis is placed in a definite network potential, which depends on the relationship of the order of magnitude of the two condensers 6 and 7. When the capacitances of such condensers are equal, there is placed upon the chassis of the device 2 the constant reference potential, and simultaneously there is present via the sensor circuit 3 the required AC voltage at the touching field 4 for adjusting the function or functions of the device 2 upon the touching of the touching field 4.

The reference character 15 indicates a terminal or point at which the potential of the chassis of the device 2 may be measured. As above explained, the diode 5 causes the potential of the chassis at 15 to be separated from the network ground when a negative AC halfwave arrives. It will be noted that the return conduit of the circuit is held at a fixed chassis potential. The input transistor of the sensor circuit 3 remains, however, locked because it is subjected to a DC current of about 12 volts. If now, by means of touching the touching field 4, the chassis potential is connected to ground, then the transistor switches through and releases a switching function.

If the connecting terminals AB of the current source are exchanged, as by changing the plug, then there is still secured the condition that the chassis of the device is separated from the network ground via the diode, in this case the diode 1. The reference potential of the chassis consequently remains constant and the changing AC fields which are superimposed on the condensers can produce in the touching human body an AC current voltage due to the fields which are radiated by the device.

A suitable sensor which may be employed for the circuit 3 herein may be a sensor known as the "SAS 560 Tastatur IS," manufactured and sold by Siemens AG.

It is to be understood that the present invention is not limited to the illustrated environment. They can also be used in electronic blocking switch including a Thyristor circuit, which in the same manner separates the electronic device during the blocking phase from the network rectifier. With such Thyristor circuit the drawbacks described in the introductory portion of the specification of known circuit arrangements are also avoided.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A circuit arrangement for establishing, at the chassis of an electrical device powered by a grounded AC supply network, a reference potential with relation to ground, said device having at least one contactless touching switch operating on the AC voltage principle, the switch being operated by touching a unipole touching field in a contactless manner, said arrangement comprising an electronic switch for selectively blocking the circuit of the device from the supply network, a half-wave rectifier including a pair of diodes individually connected in series-aiding relation between the terminals of the supply network and the terminals of the device for separating the electronic blocking switch from the supply network during a blocking phase defined by a prescribed half period of the AC cycle, and a pair of condensers individually connected in parallel with the respective diodes.

2. A circuit arrangement according to claim 1, wherein the capacitances of the two condensers are of equal magnitude.

* * * * *